United States Patent [19]

Polston

[11] Patent Number: 4,942,411
[45] Date of Patent: Jul. 17, 1990

[54] AUTOMATIC OVERLAY FEED APPARATUS FOR AN OVERHEAD PROJECTOR

[76] Inventor: Steve A. Polston, 424 Ferret Rd., Knoxville, Tenn. 37922

[21] Appl. No.: 211,856

[22] Filed: Jun. 27, 1988

[51] Int. Cl.⁵ .......................... G03B 1/04; G03B 23/12
[52] U.S. Cl. ............................ 353/26 R; 353/DIG. 2; 353/DIG. 5; 353/109
[58] Field of Search .................. 353/DIG. 2, DIG. 3, 353/DIG. 4, DIG. 5, 26 R, 26 A, 108, 109, 121, 122; 242/203

[56] References Cited

U.S. PATENT DOCUMENTS

| | | |
|---|---|---|
| 3,364,604 | 1/1968 | Donaldson . |
| 3,510,973 | 5/1970 | Mazzocco . |
| 3,680,805 | 8/1972 | Stewart . |
| 3,785,729 | 1/1974 | Dasher . |
| 4,456,201 | 6/1984 | Frias et al. .................... 353/26 R X |

FOREIGN PATENT DOCUMENTS

| | | | |
|---|---|---|---|
| 230036 | 11/1958 | Australia ............................ 353/103 |
| 3439923 | 5/1985 | Fed. Rep. of Germany ... 353/DIG. 3 |
| 1431542 | 4/1976 | United Kingdom ......... 353/DIG. 5 |

Primary Examiner—Harry N. Haroian
Attorney, Agent, or Firm—Pitts and Brittian

[57] ABSTRACT

An automatic overlay feed apparatus (10) for feeding projectable overlays to the object area (16) of an overhead projector (12). The apparatus (10) comprises a frame (20) for being supported on an overhead projector (12) and scrolling means, including a first winding shaft (36) and a second winding shaft (38) for moving an overlay scroll (24) defining a plurality of sequentially arranged projectable overlay sheets (42) across the object area (16) of the projector (12) to allow selective positioning of such projectable overlay sheets (42) on the object area (16). The apparatus (10) also includes motor means for selectively rotating at least one of the winding shafts (36, 38), and remote control means for controlling the operation of the motor means from a position remote from the projector (12).

2 Claims, 3 Drawing Sheets

AUTOMATIC OVERLAY FEED APPARATUS FOR AN OVERHEAD PROJECTOR

DESCRIPTION

1. Technical Field

This invention relates to an automatic overlay feed apparatus for feeding projectable overlays to the object area of an overhead projector. The apparatus generally comprises scrolling means mounted on a frame for selectively moving the projectable overlays of an overlay scroll into position on the display area of an overhead projector.

2. Background Art

Overhead projectors have long been a useful tool for projecting images imprinted on an opaque or transparent overlay sheet onto a viewing screen or other display surface. Generally, such projectors have an object area, illuminated evenly through the use of a fresnel lens condenser, on which projectable overlay sheets are manually placed for projection. Attempts have been made to devise mechanisms to obviate the need to manually position overlay sheets on the object area and to replace such sheets when multiple images are to be projected such as, for example, the roller assembly of U.S. Letters Patent No. 3,785,727. However, such mechanisms still require the presence of an operator at the projector to change the image being projected and to otherwise control the operator of the projector. And, it will be noted that similar attempts have been made with respect to other projection or display devices, certain of which are disclosed by U.S. Pat. Nos. 3,364,604; 3,510,973; and 3,680,805.

Therefore, it is an object of the present invention to provide an automatic overlay feed apparatus for feeding projectable overlays to the object area of an overhead projector.

Another object of the present invention is to provide an automatic overlay feed apparatus for an overhead projector which can be remotely controlled such that the projection of a plurality of overlay sheets can be controlled from a position remote from the projector.

Yet another object of the present invention is to provide an automatic overlay feed apparatus for an overhead projector which is inexpensive to manufacture and maintain.

DISCLOSURE OF THE INVENTION

Other objects and advantages will be accomplished by the present invention which provides an automatic overlay feed apparatus for feeding projectable overlays to the object area of an overhead projector. The apparatus comprises a frame for being supported on an overhead projector, and scrolling means for moving an overlay scroll defining a plurality of sequentially arranged projectable overlays across the object area of the projector to allow the selective positioning of the projectable overlays on the object area such that they can be projected. The scrolling means generally includes first and second winding shafts rotatably mounted on the frame such that the object area of the projector is disposed between the first and second shaft as the frame is positioned on the projector. The first and second winding shafts engage opposite ends of the overlay scroll and each is designed to windably receive the scroll. Accordingly, a portion of the scroll extends between the first and second winding shafts and across the object area of the projector, and selective rotation of the winding shafts results in travel of the scroll from one shaft to the other. The apparatus is also provided with motor means for selectively rotating at least one of the winding shafts, and remote control means for controlling the operation of the motor means from a position remote from the projector.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

Figure 1:
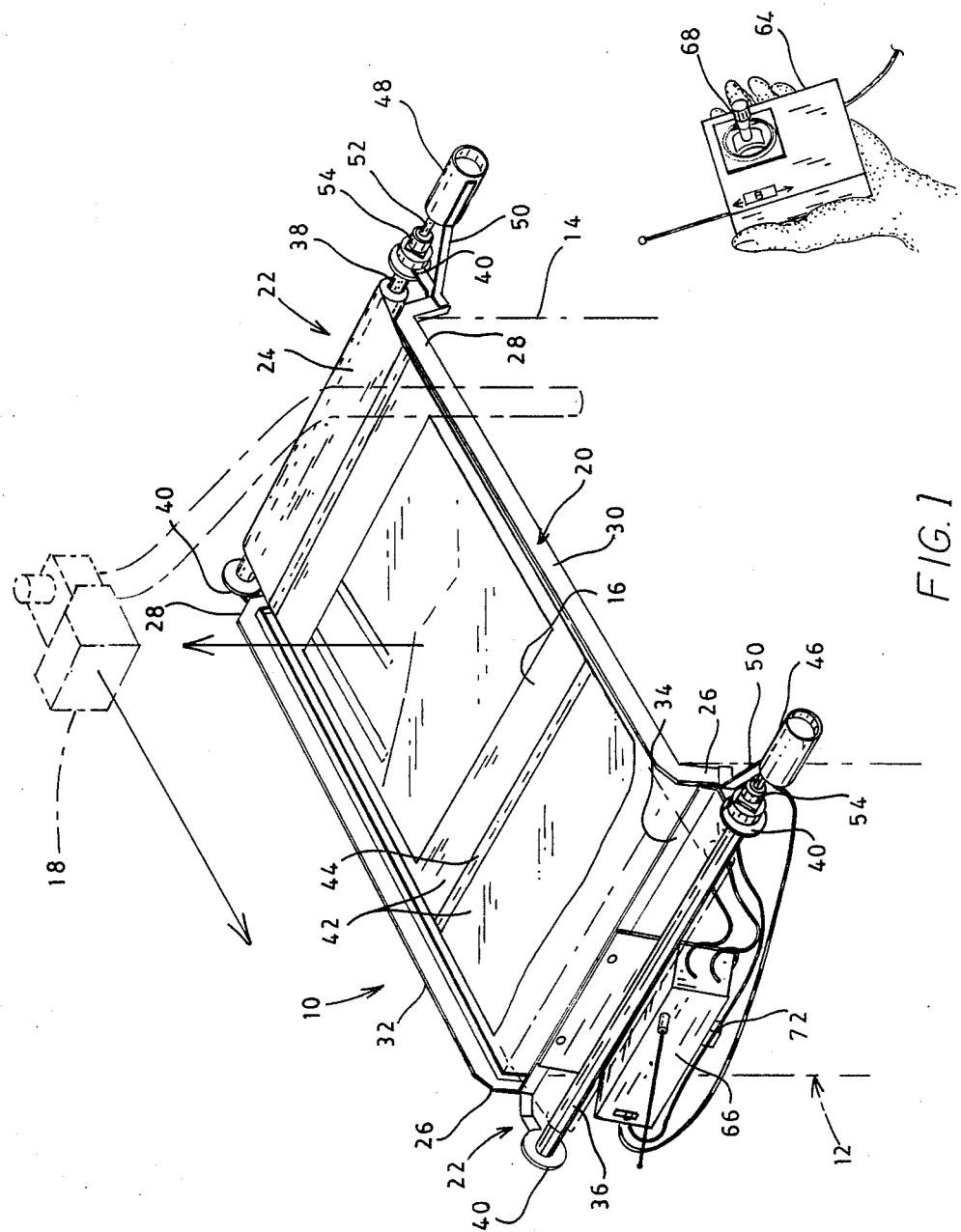
FIG. 1 illustrates a perspective view of an automatic overlay feed apparatus of the present invention.
Figure 2:
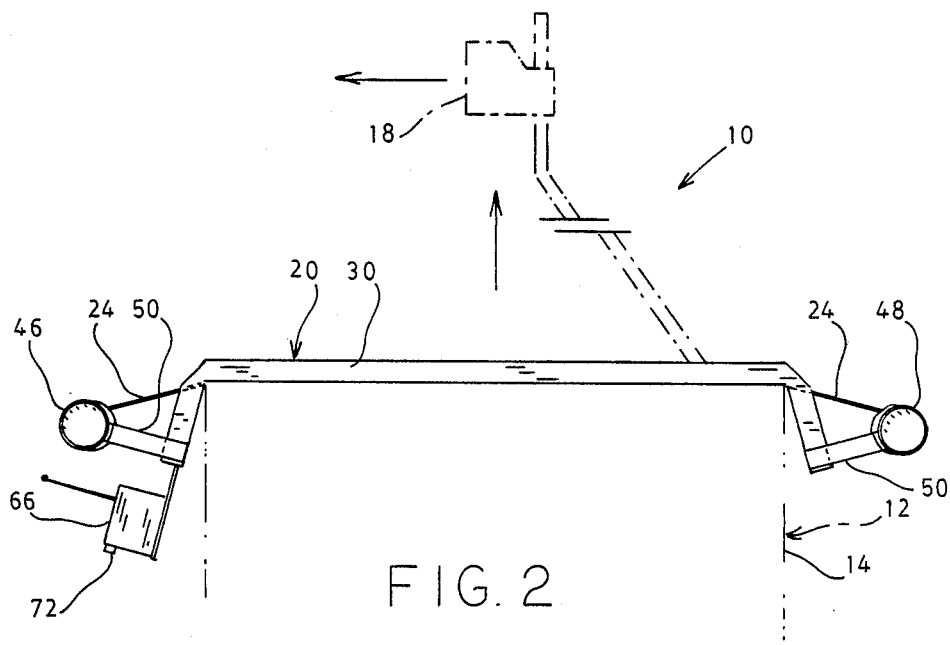
FIG. 2 is a side elevation view of an automatic overlay feed apparatus of the present invention.

An automatic overlay feed apparatus for an overhead projector incorporating various features of the present invention is illustrated generally at 10 in FIGS. 1 and 2. The apparatus 10 is designed to automatically feed multiple transparencies, or projectable overlay sheets, to an overhead projector, such as the illustrated projector 12, such that manual feeding of individual overlay sheets is unnecessary. In this regard, the conventional overhead projector 12 generally comprises illumination means (not shown) housed within an enclosure 14, the enclosure 14 having an upwardly facing object area 16 illuminated evenly by means of a fresnel lens condenser. The transparencies or projectable overlay sheets which are to be projected are placed on the object area 16 and illuminated from below. The image vertically projected from the illuminated overlay sheet is thereupon reprojected horizontally by the mirror means 18 to allow the image to be projected on a projection screen or other viewing surface (not shown).

The automatic feed apparatus 10 includes a frame 20 for supporting the apparatus 10 on the upper portion of the projector 12, and for supporting an overlay scrolling means, generally referenced at 22 in the figures. As discussed in detail below, the overlay scrolling means 22 receives an overlay scroll 24 which incorporates images to be projected and serves as a means for automatically positioning selected portions of the overlay scroll 20 on the object area 16 of the projector 12 such that they may be projected. The frame 20 defines a first end portion 26 and a second end portion 28. More specifically, the preferred embodiment comprises first and second side supports 30 and 32, respectively, joined in substantially parallel alignment proximate their opposite end portions with a pair of end supports 34 (only one shown). Thus, as is best illustrated in FIG. 1, when the apparatus 10 is in operating position, the side supports 30 and 32 are disposed on either side of the object area 16 of the projector thereby leaving the area 16 unobstructed.

The scrolling means 22 generally includes a first winding shaft 36 rotatably mounted at the first end portion 26 of the frame 20, and includes a second winding shaft 38 rotatably mounted at the second end portion 28 of the frame 20 and aligned substantially parallel to the first winding shaft 36. In the pre(erred embodiment, the rotatable mounting of the shafts 36 and 38 is accomplished through the use of four journalling brackets 40 carried by the opposite end portions of the side supports 30 and 32, the brackets 40 serving to rotatably support the shafts 36 and 38 proximate their opposite end portions. Thus, as is best illustrated in FIG. 1, the ,first and second winding shafts 36 and 38 serve to engage the opposite ends of the overlay scroll 24 such that a portion of the scroll 24 extends between the shafts 36 and 38, with the remainder of the overlay scroll 24 wound about the shaft 36 and/or the shaft 38. Therefore, selective rotation of the shafts 36 and 38 results in the movement of the scroll 24 over the object area 16 and the transfer of the scroll from one winding shaft to the other.

Whereas the scrolling means 22 is mounted on the frame 20 in the preferred illustrated embodiment, it will be recognized by those skilled in the art that the scrolling means 22 can be secured directly to the enclosure 14 of the projector 12. For example, the brackets 40, which serve to rotatably support the shafts 36 and 38, can be secured directly to the opposite end portions of the enclosure 14.

In the illustrated embodiment, the overlay scroll 24 comprises a plurality of transparencies or projectable overlay sheets 42 joined by bonding means, such as the adhesive tape 44, to create a series of projectable images. However, it will be understood that the scroll 38 can comprise an integrally formed sheet of projectable material with the images to be projected sequentially imprinted thereon.

Figure 4:
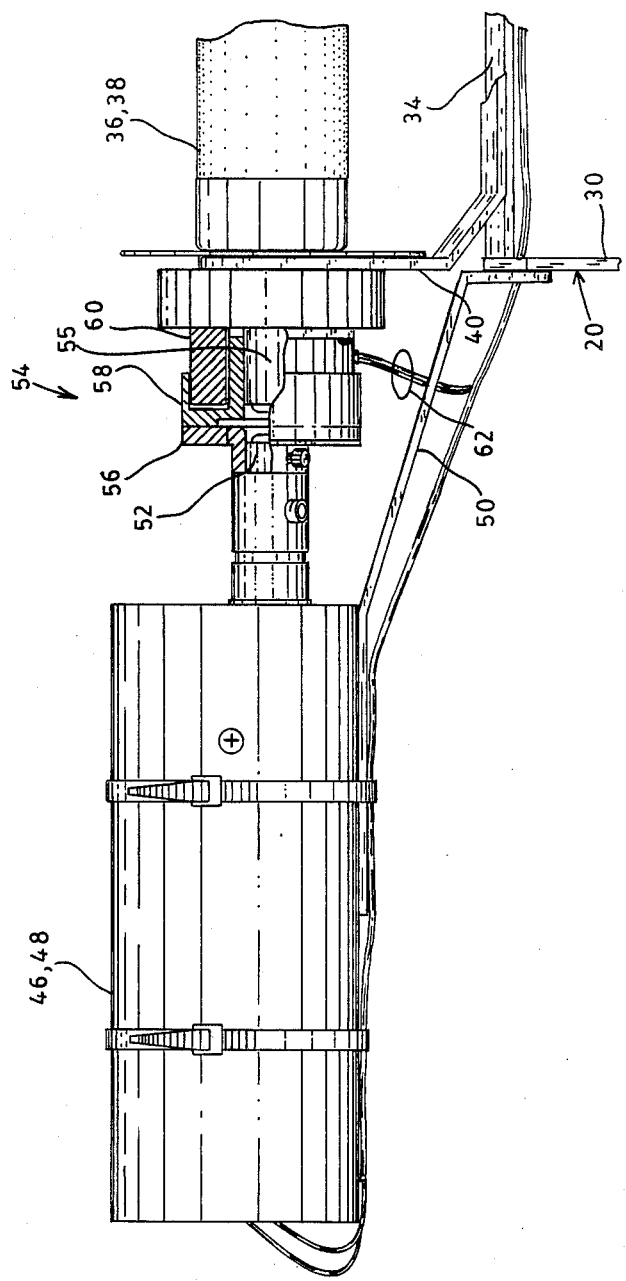
FIG. 4 is a top view of the motor means of an automatic overlay feed apparatus of the present invention.

In order to automatically move the sequential images imprinted on the overlay scroll into position over the object area 16, and to transfer the scroll from one winding shaft to another, the apparatus 10 is provided with electrically powered motor means for selectively rotating at least one of the shafts 36 or 38. In the preferred embodiment, such motor means includes a first motor 46 for selectively rotating the first shaft 36 and a second motor 48 for selectively rotating the second shaft 38. More specifically, the first motor 46 is secured to the frame 20 with a motor mounting bracket 50 such that the drive shaft 52 of the motor 46 is axially aligned with the shaft 36. As is best illustrated in FIG. 4, the motor means further includes a clutch coupling 54 for connecting the drive shaft 52 to the outboard end 55 of the winding shaft 36. In this regard, the clutch coupling 54 allows the drive shaft 52 to engage or disengage the winding shaft 36 as desired such that when the drive shaft 36 is not engaged for the purpose of rotating the shaft 36, it can be disengage to allow the shaft 36 to rotate independently.

In the preferred embodiment, the clutch coupling 54 comprises an electromagnetically actuated clutch coupling. As is best illustrated in FIG. 4, the coupling 54 includes an armature member 56 which is mounted on the outboard end of the drive shaft 52, a rotor member 58 mounted on the outboard end 55 of the shaft 36, and a field member 60 mounted on the associated bracket 40. As will be understood by those skilled in the art, when the field member 60 is electrically energized through the wires 62, the rotor member 58, rotatably mounted on the shaft 36, is electromagnetically charged so as to attract and engage the armature member 56. Resultantly, when the field member 60 is energized, the winding shaft 36 rotates with the drive shaft 52. One suitable clutch coupling for this purpose is the Warner SR-120, manufactured by Warner Electric Brake & Clutch Company, South Beloit, Illinois.

It will also be noted that the second motor 48 is coupled to the second winding shaft 38 with a further clutch coupling 54 as described above and as illustrated in FIG. 4. Therefore, the first motor 46 can be engaged and energized, and the second motor 48 disengaged, to move the scroll 24 in the direction of the shaft 36, and the second motor 48 can be engaged and activated, and the first motor 46 disengaged, to move the scroll 24 in the direction of shaft 38, thereby allowing the various overlay sheets 42 to be positioned on the object area 16 as desired.

Figure 3:
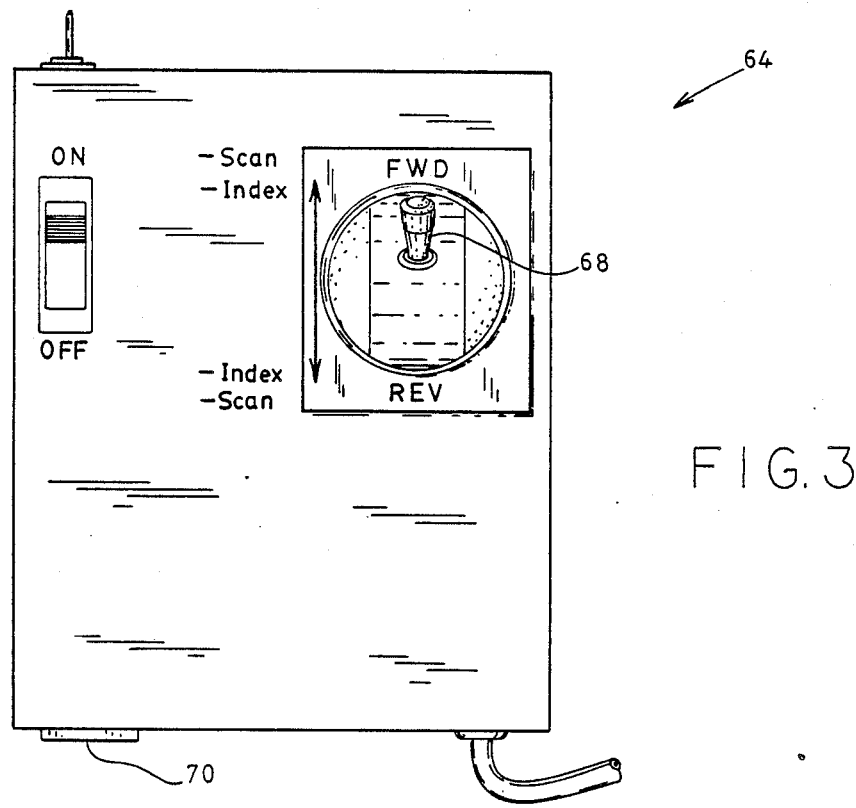
FIG. 3 is a top view of the transmitter of the remote control means of an automatic overlay feed apparatus of the present invention.

In order to control the operation of the motors 46 and 48, and the clutch couplings 54, the apparatus 10 is provided with remote control means, including a transmitter 64, preferably of a radio type, and a receiver/actuator 66 as illustrated in FIGS. 1 and 3. Further, the transmitter 64 includes a control lever 68 for selecting the direction of travel of the overlay scroll 24. As will be understood by those skilled in the art, the receiver/actuator 66 serves as an electrical switching means, connected through suitable circuitry to the motors 46 and 48, and the clutch couplings 54, for selectively energizing the motor 46 and its associated clutch coupling 54, or the motor 48 and its associated clutch coupling 54, in response to radio signals emitted from the transmitter 64. Thus, through manipulation of the lever 68, the movement of the scroll 24 between the shafts 36 and 38 can be controlled from a position remote from the projector 12. It will also be noted that the lever 68 can be discreetly positionable to allow the operator to switch between a scan mode and an index mode in either direction of travel. For example, in the illustrated embodiment of FIG. 3, the lever 68 is discreetly positionable in a stop position, where no travel of the scroll 24 occurs, in forward index and forward scan positions, and in reverse index and scan positions. In this regard, when the transmitter is in scan mode, actuation of the lever 68 results in continuous travel of the scroll 24 in the selected direction. When in the index mode, actuation of the lever 68 results in travel of the scroll 24 sufficient to replace the overlay sheet position on the object area with the adjacent overlay sheet in order to facilitate the sequential projection of overlay sheets. It will also be noted that both the transmitter 64 and the receiver/actuator 66 can be powered by rechargable batteries (not shown) and provided with the recptors 70 and 72, respectively, for connecting such batteries to suitable recharging means.

In light of the above, it will be understood that the present invention provides an automatic overlay feed apparatus for an overhead projector with great advantages over the prior art. Not only does the apparatus 10 obviate having to manually place projectable overlays on the object area of an overhead projector, it allows the operator to selectively feed overlays to the object area of the projector from a position remote from the projector. Of course, while a preferred embodiment has been shown and described, it will be understood that there is no intent to limit the invention to such disclosure, but, rather, it is intended to cover all modifications and alternate constructions falling within the spirit and scope of the invention as defined in the appended claims.

I claim:

1. An automatic overlay feed apparatus for automatically feeding projectable overlays to the object area of an overhead projector, said apparatus utilizing an overlay scroll having first and second end portions and defining a plurality of projectable overlays sequentially arranged from said first end portion to said second end portion, said apparatus comprising:

a frame for being supported on said projector, said frame having a first end portion and a second end portion;

overlay scrolling means for selectively moving said projectable overlays into position on said object area, said scrolling means including a first winding shaft rotatably mounted on said frame for engaging said first end portion of said overlay scroll and for windably receiving said overlay scroll, and a second winding shaft rotatably mounted on said frame in a position selectively spaced from, and in substantially parallel alignment with, said first shaft for engaging said second end portion of said scroll, whereby as said frame is selectively positioned on said projector, and as said scroll is windably received by said first and second winding shafts, a selected portion of said scroll extending between said first and second winding shafts overlays said object area of said projector;

motor means for selectively rotating said first and second winding shafts, said motor means including a first motor for selectively rotating said first winding shaft and a second motor for selectively rotating said second winding shaft, each said first and second motor having a drive shaft;

a first electromagnetically actuated clutch coupling for connecting said drive shaft of said first motor with said first winding shaft whereby said first winding shaft can be selectively disengaged to rotate independently from said drive shaft, said clutch coupling including an armature member mounted on said drive shaft of said first motor, a rotor member mounted on said first winding shaft, and a field member for being electromagnetically charged by a suitable power source, said field member being mounted on said frame in close proximity to said rotor member, whereby the selective electromagnetic charging of said field member electromagnetically charges said rotor member whereupon said rotor member attracts and engages said armature member such that said drive shaft serves to rotate said first winding shaft; and a second electromagnetically actuated clutch coupling for connecting said drive shaft of said second motor with said second winding shaft, whereby said second winding shaft can be selectively disengaged to rotate independently from said drive shaft of said second motor, said clutch coupling including an armature member mounted on said drive shaft of said second motor, a rotor member mounted on said second winding shaft, and a field member for being electromagnetically charged by a suitable power source, said field member being mounted on said frame in close proximity to said rotor member, whereby the selective electromagnetic charging of said field member electromagnetically charges said rotor member whereupon said rotor member attracts and engages said armature member such that said drive shaft serves to rotate said second winding shaft.

2. An overhead projector with automatic overlay feed apparatus for automatically feeding projectable overlays, said projector utilizing an overlay scroll having first and second end portions and defining a plurality of projectable overlays defining projectable images sequentially arranged from said first end portion to said second end portion, said projector comprising:

a projector enclosure having a first end portion and a second end portion and having an upper surface defining an object area for receiving said projectable overlays;

illumination means for illuminating said object area of said enclosure whereby said projectable image of said projectable overlays received on said object area are upwardly projected;

mirror means for receiving said projectable images projected from said object area and projecting said images in a substantially horizontal direction;

overlay scrolling means for selectively moving said projectable overlays into position on said object area, said scrolling means including a first winding shaft rotatably mounted on said enclosure for engaging said first end portion of said overlay scroll and for windably receiving said overlay scroll, and a second winding shaft rotatably mounted on said enclosure in a position selectively spaced from, and in substantially parallel alignment with, said first shaft for engaging said second end portion of said scroll and windably receiving said overlay scroll, whereby, as said scroll is windably received by said first and second winding shafts, a selected portion of said scroll extending between said first and second winding shafts overlays said object area of said projector;

motor means for selectively rotating said first and second winding shafts, said motor means including a first motor for selectively rotating said first winding shaft and a second motor for selectively rotating said second winding shaft, each said first and second motor having a drive shaft;

a first electromagnetically actuated clutch coupling for connecting said drive shaft of said first motor with said first winding shaft whereby said first winding shaft can be selectively disengaged to rotate independently from said drive shaft, said clutch coupling including an armature member mounted on said drive shaft of said first motor, a rotor member mounted on said first winding shaft, and a field member for being electromagnetically charged by a suitable power source, said field member being mounted on said enclosure in close proximity to said rotor member, whereby the selective electromagnetic charging of said field member electromagnetically charges said rotor member whereupon said rotor member attracts and engages said armature member such that said drive shaft serves to rotate said first winding shaft; and a second electromagnetically actuated clutch coupling for connecting said drive shaft of said second motor with said second winding shaft, whereby said second winding shaft can be selectively disengaged to rotate independently from said drive shaft of said second motor, said clutch coupling including an armature member mounted on said drive shaft of said second motor, a rotor member mounted on said second winding, and a field member for being electromagnetically charged by a suitable power source, said field member being mounted on said enclosure in close proximity to said rotor member, whereby the selective electromagnetic charging of said field member electromagnetically charges said rotor member whereupon said rotor member attracts and engages said armature member such that said drive shaft serves to rotate said second winding shaft.

* * * * *